Feb. 4, 1936.  G. R. HUTCHISON  2,030,004
DISPENSING APPARATUS
Filed July 18, 1935   3 Sheets-Sheet 1
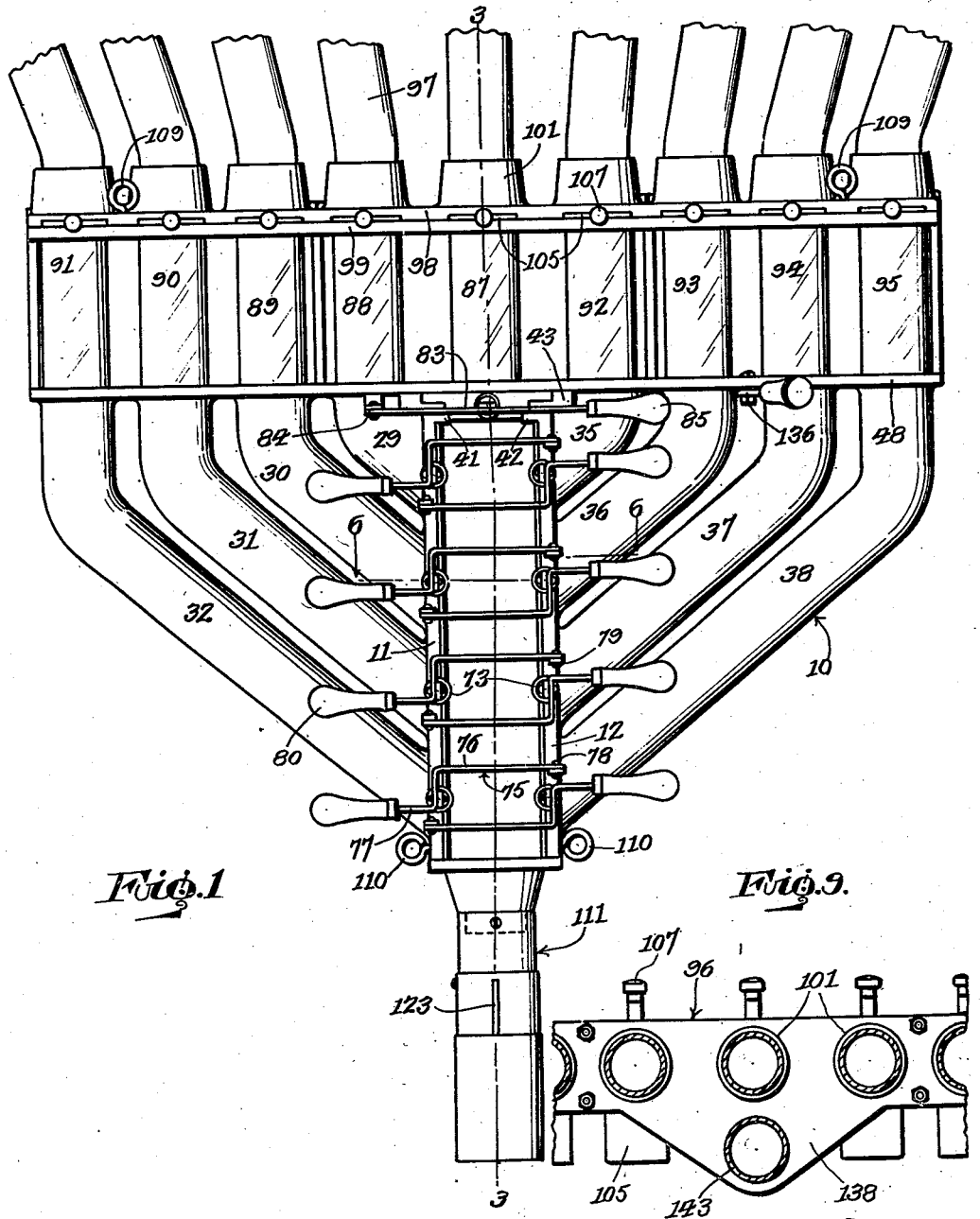
Inventor
George R. Hutchison
By Geo. P. Kimmel
Attorney

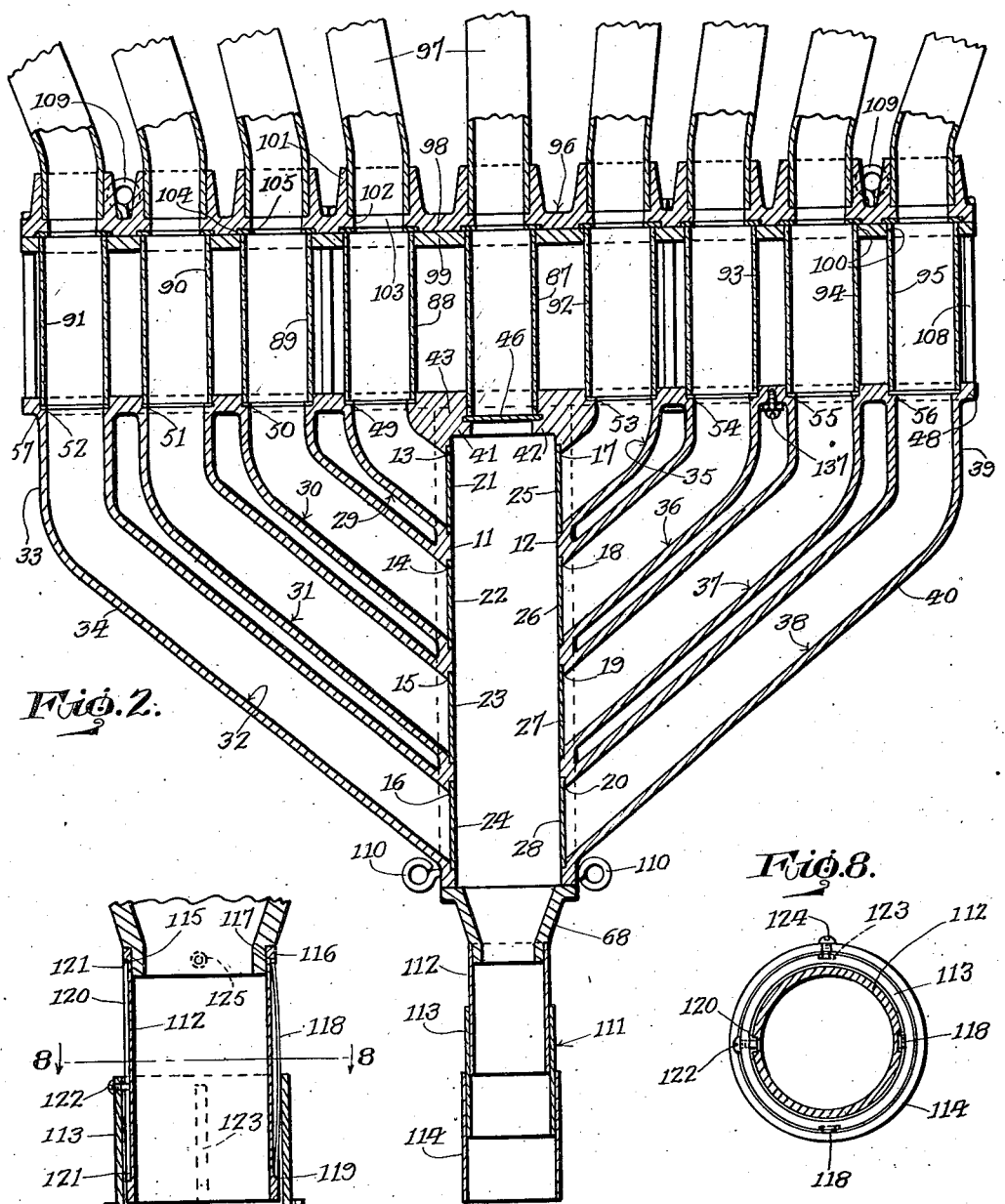

Feb. 4, 1936.  G. R. HUTCHISON  2,030,004
DISPENSING APPARATUS
Filed July 18, 1935   3 Sheets-Sheet 3
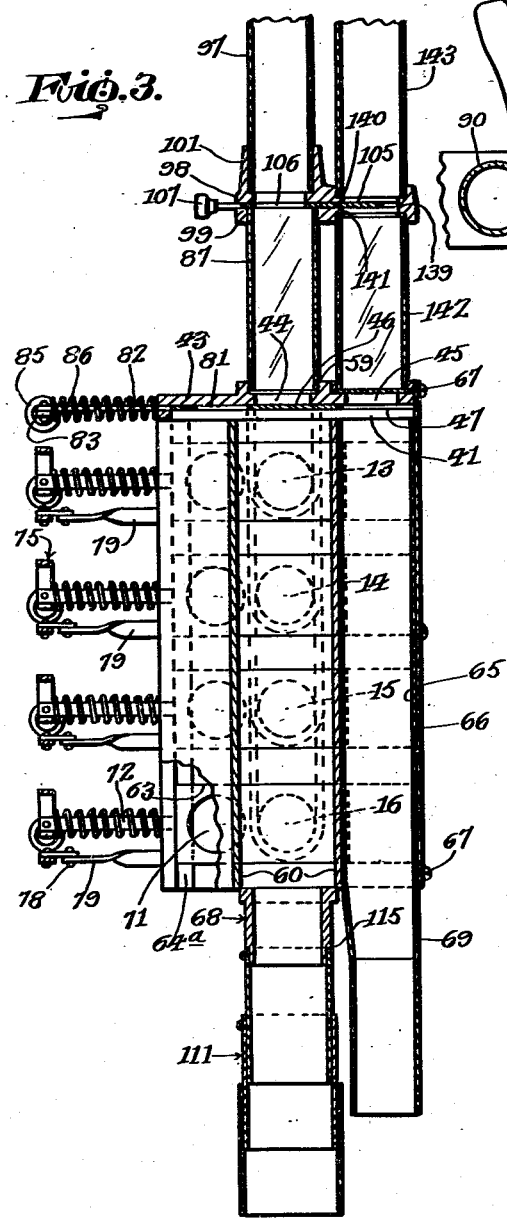
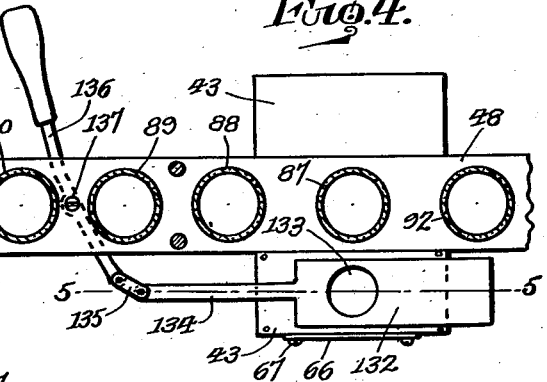
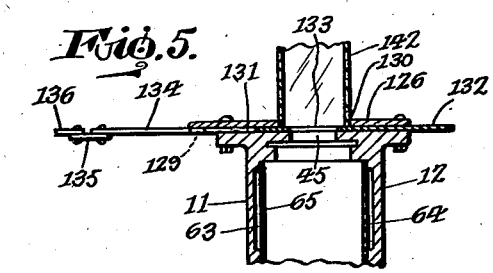
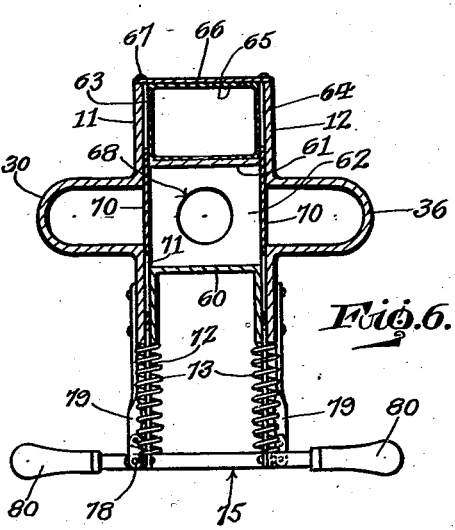
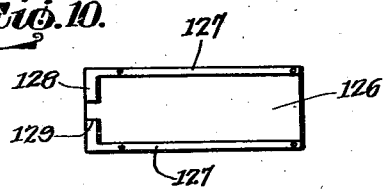
Inventor
George R. Hutchison
By Geo. P. Kimmel
Attorney Patented Feb. 4, 1936

2,030,004

UNITED STATES PATENT OFFICE 2,030,004

DISPENSING APPARATUS

George R. Hutchison, Beckley, W. Va.

Application July 18, 1935, Serial No. 32,089

13 Claims. (Cl. 221—146)

This invention relates to a dispensing apparatus particularly adapted for use in connection with grocery stores, but it is to be understood that the apparatus, in accordance with this invention may be employed in any connection for which it may be found applicable, and the invention has for its object to provide, in a manner as hereinafter set forth, a dispensing apparatus by means of which groceries, such as beans of various kinds, rice, coffee, tea, flour and the like, may be separately conducted from suitable sources of supply and selectively discharged into a container seated upon a scale.

A further object of the invention is to provide a dispensing apparatus for the purpose aforesaid, by means of which a desired quantity of a selected commodity may be conveniently and expeditiously transferred from a source of supply to a bag or the like, and the flow of the commodity to the bag instantly stopped when the desired quantity thereof has been discharged into the bag.

A further object of the invention is to provide, in a manner as hereinafter set forth, a dispensing apparatus for the purpose referred to including means whereby it may be suspended at any point desired, especially in a manner to have its discharged end disposed over a scale in spaced relation to the latter.

With the foregoing and other objects in view, the invention consists of the novel construction, combination and arrangement of parts as will be hereinafter more particularly described, and as are illustrated in the accompanying drawings wherein is shown an embodiment of the invention, but it is to be understood that changes, variations and modifications may be resorted to which fall within the scope of the invention as claimed.

In the drawings wherein like reference characters denote corresponding parts throughout the several views:

Figure 1 is a rear elevation of the apparatus and illustrating the adaptation thereof with respect to a series of commodity supply pipes, Figure 2 is a vertical sectional view of the apparatus, Figure 3 is a section on line 3—3, Figure 1, Figure 4 is a fragmentary view in top plan of the apparatus, Figure 5 is a section on line 5—5, Figure 4, Figure 6 is a section on line 6—6, Figure 1, Figure 7 is a fragmentary view in vertical section illustrating the telescopic discharge nozzle extended, Figure 8 is a section on line 8—8, Figure 7, Figure 9 is a fragmentary view in top plan of the valve controlled receiver element for the commodity supply pipes, and Figure 10 is a detail in inverted plan.

The apparatus includes a casting constituting the body part 10 thereof. The body part comprises a pair of spaced parallel vertically disposed plates 11, 12 of like form and each of which is provided centrally with a series of superposed discharge openings. As shown by way of example, each plate has four discharge openings, but it is to be understood that this number may be increased or diminished, depending upon the number of commodity conducting pipes. The openings in plate 11 are designated 13, 14, 15, 16. The openings in the plate 12 are indicated at 17, 18, 19, 20. The openings 13, 14, 15 and 16 are arranged respectively in opposed parallel spaced relation relative to the openings 17, 18, 19 and 20. The openings 13, 14, 15, 16, 17, 18, 19 and 20 are normally closed by spring controlled slidable valves 21, 22, 23, 24, 25, 26, 27 and 28, respectively. These valves are of like form and the construction thereof, as well as their mountings, will be hereinafter referred to.

Integral with the outer face of plate 11 and registering with the openings 13, 14, 15 and 16 is a series of spaced superposed conducting pipes 29, 30, 31 and 32. Each of the conducting pipes includes an upstanding upper end part 33 and a downwardly inclined part 34 leading to plate 11. The pipes progressively increase in length from the pipe 29 to the pipe 32. Pipes 29 to 32 extend laterally from the plate 11. Integral with the outer face of the plate 12 and registering with the openings 17, 18, 19 and 20 is a series of spaced superposed conducting pipes 35, 36, 37 and 38, respectively, and each is formed with an upstanding upper end portion 39 and a downwardly inclined lower portion 40 which extends towards the plate 12. The pipes 35 to 38 progressively increase in length from pipe 35 to pipe 38. The pipes 35 to 38 are disposed laterally with respect to the plate 12 and extend in an opposite direction with respect to pipes 29 to 32.

The plates 11, 12 have extending inwardly from the upper ends of their inner faces oppositely disposed flanges 41, 42 (Figure 1). Integral with the top of the plates 11, 12 is a flat horizontally disposed plate 43 which projects laterally from the upper ends of the plates 11, 12 and is also flush at its ends with the side edges of the plates 11, 12. The plate 43 at its center is formed with an opening 44 and spaced forwardly of the opening 44 with an opening 45. The opening 44 is normally closed by a spring controlled slide valve 46 (Figure 3) slidably mounted in opposed grooves 47 formed between plate 43 and the flanges 41, 42. The construction of the valve 46 will be hereinafter referred to.

Formed integral with the upper face of the plate 43 is a flat oblong crosshead 48. The plate 43 at its center is integral with the central portion of the lower face of the crosshead 48. The latter extends an equi-distance from each side of plate 43. The crosshead 48 is formed in one side portion thereof with a series of spaced openings 49, 50, 51, 52. The crosshead 48 at the other side thereof is provided with a series of spaced openings 53, 54, 55, 56. Each of the said series of openings has its wall formed with an annular shoulder 57. The crosshead 48 centrally thereof has an opening 58, registering with the opening 44 and having its wall provided with an annular shoulder 59 (Figure 3). The upper ends of the pipes 29, 30, 31 and 32 are integral with the crosshead 48 and register with the openings 49, 50, 51 and 52, respectively. The upper ends of the pipes 35, 36, 37 and 38 are integral with the crosshead 48 and register with the openings 53, 54, 55 and 56 respectively.

Secured between the plates 11, 12 and extending from the lower to the upper ends thereof is a wall forming member 60 which is of yoke-shape in sectional plan. Secured between the plates 11, 12, arranged in spaced relation with respect to the member 60 and extending from the lower to the upper ends of the plate 11, 12, is a wall forming member 61 (Figure 6). The members 60, 61 coact with the plates 11, 12 to provide a vertically disposed open bottom chute 62 which is common to the conducting pipes. These latter are normally closed by the valves 21 to 28, both inclusive. The side plates 11, 12 are transversely grooved on their inner faces, as at 63, 64 (Figure 6), to form guide passages for the valves 21 to 28, both inclusive. The normal position of the valves relative to the conducting pipes is as shown in Figure 2. Positioned against the member 61 and arranged between the forward portions of the plates 11, 12 is an upstanding chute forming member 65 open at its lower end. The member 61 is arranged between the forward portions of the plates 11, 12. The member 60 is arranged between the rear portions of the plates 11, 12 (Figure 6). The forward portions of the plates 11, 12 are closed by a wall forming member 66 which is secured against the forward side edges of the said plates 11, 12 by the holdfast means 67. The member 66 opposes the member 65 and retains the latter between the plates 11, 12. Secured to the lower ends of the plates 11, 12 is a tapered outlet member 68 (Figures 2 and 3) for the chute 62. The member 65 extends below the plates 11, 12 and that portion of member 65 which depends below the plates 11, 12 constitutes an outlet 69 (Figure 3).

Each of the valves 21 to 28 is in the form of a rectangular slide 70 (Figures 3 and 6) formed with an opening 71 in proximity to one end thereof. The slide 70 has extending rearwardly therefrom a stem 72 surrounded by a coil controlling spring 73 interposed between the side edge of a plate 11 or 12 and a stretch 74 of a handle member 75. The latter not only includes the stretch 74, but stretches 76 and 77. The stretch 76 is pivotally connected, as at 78, to a support 79 anchored to and extending rearwardly from a plate 11 or 12. The stretch 76 merges into the stretch 74. The latter merges into the stretch 77 and carries a handle piece 80. The stretch 74 is disposed at right angles to the stretches 76, 77 and provides for the stretches 76, 77 to extend in spaced parallel planes. The stretch 74 is anchored to the outer end of the valve stem 72. The operating handles for the valves 21 to 24, inclusive, are pivotally connected with the plate 12. The operating handles for the valves 25 to 28, inclusive, are pivotally connected with the plate 11. With reference to Figure 1, it will be seen that the operating handles for the valves 21 to 24 extend laterally from the plate 11 and that the operating handles for the valves 25 to 28 extend laterally from the plate 12.

The valve 46 is constructed in the same manner as the valves 21 to 28, both inclusive, but it is disposed horizontally. The valve 46 has an opening 81, a stem 82, a shifting lever 83 connected to the outer end of stem 82 (Figures 1 and 3). The lever 83 is pivotally connected, as at 84, with the crosshead 48 and is provided with a handle piece 85 (Figure 1). Interposed between the lever 83 and the plate 43 and surrounding the stem 82 is a coil controlling spring 86.

Seated in the opening 58, as well as being mounted on shoulder 59, is a transparent conducting pipe 87 for discharging a commodity into the upper end of the chute 62. The pipe 87 is normally closed to chute 62 by the valve 46.

The pipes 29, 30, 31, 32, 35, 36, 37 and 38 are provided with transparent vertically disposed intake members 88, 89, 90, 91, 92, 93, 94, 95. The lower ends of said transparent intake members seat upon the shoulders of the openings 49, 50, 51, 52, 53, 54, 55 and 56. The intake members are supported by the crosshead 48.

Arranged above the crosshead 48 in spaced relation to the latter is a valve controlled receiver element 96 for the commodity supply pipes 97 and for retaining the transparent intake members of the conducting pipes in position. The element 96 consists of upper and lower oblong sections 98, 99 arranged in abutting relation. The section 99 is formed with a series of spaced openings 100, into which extend the upper ends of the transparent intake members of the conducting pipes. The upper ends of the intake members (Figure 2) register with the top of the section 99. The section 98 is formed with a series of upstanding collars 101, internal shoulders 102 at the base of the collars, openings 103 for communication with the transparent intake members of the conducting pipes, and spaced pairs of oppositely disposed rabbets 104 in its lower face. The pipe 87 extends into one of the openings 100 and the section 99. Each pair of oppositely disposed rabbets 104 coacts with the upper face of the section 99 to provide a pair of guide grooves for the reception of a slidable controlling valve 105. The latter has an opening 106 and a handle piece 107. The opening 106 in valve 105 is normally in registry with an opening 100. The pipes 97 extend into the collars 101 and are mounted on the shoulders 102. The pipes 97 extend from suitable sources of supply.

The valves 105 provide means shutting off the supply pipes 97, if a transparent intake member or pipe 87 becomes broken and such means permits of a new intake member or pipe 87 being substituted when a commodity supply is shut off. The element 96 is connected to the crosshead 48 by stay bolts 108 which are shouldered for the seating thereon of section 99 of element 96.

The element 96 at its front and rear has upstanding eyes 109. The plates 11, 12 at their lower ends have laterally disposed eyes 110. The eyes 109, 110 are employed for coupling to the apparatus suitable suspension means therefor. The apparatus includes a telescopic discharge spout for the outlet member 68 of the chute 62. The telescopic discharge spout is indicated at 111 and includes an upper sleeve 112, an intermediate sleeve 113 and a lower sleeve 114. The lower end of the outlet member 68 is rabbetted, as at 115, (Figures 2 and 7) to receive the upper end of the sleeve 112. The upper end of the sleeve 112 is flanged, as at 116, and extending into the latter are the upper ends 117 of bow-shaped latching springs 118 which coact with the inner face of sleeve 113 for frictionally latching sleeve 113 to sleeve 112. The lower end of sleeve 112 has a flange 119 against which abuts the lower end of the springs 118. The outer periphery of the sleeve 112 is formed with a pair of spaced lengthwise extending grooves 120 which terminate adjacent the upper and lower ends of said sleeve whereby stops 121 are formed (Figure 7). The sleeve 113 carries a pair of inwardly extending studs 122 which travel in the grooves 120 and slidably connect sleeve 113 to sleeve 112. The sleeve 113 is formed in its outer periphery with a pair of diametrically disposed lengthwise extending grooves 123, and operating in each of said grooves 123 is a stud 124 carried by the sleeve 114 whereby the latter is slidably connected to sleeve 113.

The studs 122 and 124 are adjustably connected to the sleeves 113, 114, respectively. Holdfast means, indicated at 125, is employed for fixedly securing the sleeve 112 to the lower end of the outlet member 68.

Mounted upon and anchored to that portion of plate 43 which extends forwardly from the crosshead 48 is a combined guide and retainer member 126 (Figures 5 and 10). The member 126 is a plate-like form and has each lengthwise marginal portion of its lower face formed with a rib 127. Each rib at one end terminates into a right angularly disposed rib 128. The ribs 128 are arranged in spaced relation to provide a guide passage 129. The member 126 is formed with an opening 130 adapted to register with the opening 45. The member 126 in connection with the plate 43 forms a slide valve chamber 131 for slide valve 132 formed with an opening 133 normally registering with the opening 45. Valve 132 has a stem 134 which is arranged in passage 129. Stem 134 is connected by a pivoted link 135 to an actuating handle 136, pivoted as at 137 with the lower face of the cross-head 48. The element 96, centrally thereof, has a forward extension 138 (Figures 3 and 9) arranged in superposed relation with respect to the member 126. The extension 138 is formed with an opening 139 having its wall oppositely provided with spaced superposed rabbets that form a pair of shoulders 140, 141. Extending into the opening 130 and seating on valve 132 is a vertically disposed transparent intake member 142 for the chute 65. The member 142 abuts shoulder 141. Abutting shoulder 140 is the lower end of a supply pipe 143 which may be employed for supplying carbide or sugar to the chute 65. The pipe 143 is normally closed by one of the slide valves 105 to the intake member 142. The latter is normally closed to the chute 65 by the valve 132.

The transparent intake members will indicate to the operator the commodities in the various conducting pipes, as well as the commodity which is to be carried off by the chute 65.

The valves 21 to 26 normally close the conducting pipes 29 to 32 and 35 to 38. The valve 46 normally closes the member 87 to the chute 62. The valve 132 normally closes the member 142 to the chute 65.

The discharge spout 111 is extendible as telescopic for the purpose to compensate the different height of containers in which the commodity or commodities is or are to be discharged into.

The conducting pipes 29 to 32 and 35 to 38 are formed of upper transparent and lower opaque sections. The lower or opaque section of each of said pipes is provided by that part of a pipe which is integral with a plate 11 or 12 and the crosshead. The upper or transparent section of each of said pipes is provided by one of the transparent intake members.

The plate 11, as well as the plate 12, has its inner face formed with a vertically disposed groove 64ᵃ (Figure 3) extending from the lower to the upper end thereof in proximity to their rear edges. The groove 64ᵃ in plate 11 is intersected by the groove 63. The groove 64ᵃ in the plate 12 is intersected by the groove 64. The grooves 64ᵃ provide for a discharge of the dust which may collect in the grooves 63, 64. The outward movement of the slide valves in the grooves 63, 64 provide for the shifting of the dust to the grooves 64ᵃ to be discharged from the bottom of the latter.

What I claim is:

1. In a dispensing apparatus, a plurality of upstanding downwardly inclined normally closed valve controlled selectably opened commodity conducting pipes, a chute common to the outlet ends of said pipes, each of said pipes including a transparent intake member for viewing the commodity conducted by the pipe, a plurality of commodity supply pipes, and a combined receiver and holder structure common to said supply pipes and intake members, said structure being formed with openings for establishing communication between the supply pipes and intake members and selectable cutoffs for said supply pipes.

2. In a dispensing apparatus, a pair of oppositely extending sets of superposed upstanding inwardly downwardly inclined normally closed valve controlled selectably opened commodity conducting pipes, each formed of an opaque lower section and a transparent upper section constituting an intake member, an apertured crosshead integral with the upper ends of the lower pipe sections and having the lower ends of the upper pipe sections seated therein, a discharge chute common to the outlet ends of said pipes, and a structure provided with means for supporting the lower ends of commodity supply pipes, for receiving the upper ends of said intake members and for establishing communication between the supply pipes and said members, said structure being anchored to said crosshead.

3. In a dispensing apparatus, a pair of oppositely extending sets of superposed upstanding inwardly downwardly inclined normally closed valve controlled selectably opened commodity conducting pipes, each formed of an opaque lower section and a transparent upper section constituting an intake member, an apertured crosshead integral with the upper ends of the lower pipe sections and having the lower end of the upper pipe sections seated therein, a discharge chute common to the outlet ends of said pipes, a structure provided with means for supporting the lower ends of commodity supply pipes, for receiving the upper ends of said intake members and for establishing communication between the supply pipes and said members, said structure being anchored to said crosshead, and a lengthwise adjustable outlet nozzle depending from said chute.

4. In a dispensing apparatus, a pair of oppositely extending sets of superposed upstanding inwardly downwardly inclined normally closed valve controlled selectably opened commodity conducting pipes, each formed of an opaque lower section and a transparent upper section constituting an intake member, an apertured crosshead integral with the upper ends of the lower pipe sections and having the lower ends of the upper pipe sections seated therein, a discharge chute common to the outlet ends of said pipes, a structure provided with means for supporting the lower ends of commodity supply pipes, for receiving the upper ends of said intake members and for establishing communication between the supply pipes and said members, said structure being anchored to said crosshead, a normally closed spring controlled closure valve for outlet end of each conducting pipe, said valves being slidably mounted in walls of said chute, and pivoted means for selectively shifting said valves to provide for discharge from said conducting pipes into the chute.

5. In a dispensing apparatus, a pair of oppositely extending sets of superposed upstanding inwardly downwardly inclined normally closed valve controlled selectably opened commodity conducting pipes, each formed of an opaque lower section and a transparent upper section constituting an intake member, an apertured crosshead integral with the upper ends of the lower pipe sections and having the lower ends of the upper pipe sections seated therein, a discharge chute common to the outlet ends of said pipes, a structure provided with means for supporting the lower ends of commodity supply pipes, for receiving the upper ends of said intake members and for establishing communication between the supply pipes and said members, said structure being anchored to said crosshead, and selectable shiftable cutoff valves in said structure for the supply pipes.

6. In a dispensing apparatus, a vertical discharge chute, spaced vertically disposed transparent tubular members, a crosshead supporting said members, selectably opening normally closed valve controlled means for establishing communication between said members and chute, the valves of said means being spring controlled and slidably connected to said chute, pivotally supported means connected to said valves for selectably shifting them to open position, and a structure provided with means for supporting commodity supply pipes, for receiving the upper ends of said members and for establishing communication between said members and the supply pipes, said structure being anchored to said crosshead.

7. In a dispensing apparatus, a vertical discharge chute, spaced vertically disposed transparent tubular members, a crosshead supporting said members, selectably opening normally closed valve controlled means for establishing communication between said members and chute, the valves of said means being spring controlled and slidably connected to said chute, pivotally supported means connected to said valves for selectably shifted them to open position, a structure provided with means for supporting commodity supply pipes, for receiving the upper ends of said members and for establishing communication between said members and the supply pipes, said structure being anchored to said crosshead, and a lengthwise adjustable discharge nozzle, extended from the lower end of the chute.

8. In a dispensing apparatus, a vertical discharge chute, spaced vertically disposed transparent tubular members, a crosshead supporting said members, selectably opening normally closed valve controlled means for establishing communication between said members and chute, the valves of said means being spring controlled and slidably connected to said chute, pivotally supported means connected to said valves for selectably shifting them to open position, a structure provided with means for supporting commodity supply pipes, for receiving the upper ends of said members and for establishing communication between said members and the supply pipes, said structure being anchored to said crosshead, said chute being open at its bottom, and said structure being provided with normally opened selectable shiftable cutoffs for the supply pipes.

9. In a dispensing apparatus, a structure forming an upstanding chute provided with openings and spring controlled selectable shiftable valves slidably mounted in said structure for normally closing said openings, pivoted means arranged at the rear of said structure and connected to said valves for selectably shifting them, a crosshead integral with the top of said structure and provided with spaced openings, a set of spaced upstanding tubular transparent commodity receiving members seated at their lower ends in the openings of the crosshead, one of said members communicating with one of the openings in said structure for discharge into the upper end of said chute, commodity conducting means leading from the other of the said members to the other of the said openings in said structure, an upper structure provided with means for supporting commodity supply pipes, for receiving the upper ends of said members and for establishing communication between said members and supply pipes, and means for anchoring said upper structure to said crosshead.

10. In a dispensing apparatus, a structure forming an upstanding chute provided with openings and spring controlled selectable shiftable valves slidably mounted in said structure for normally closing said openings, pivoted means arranged at the rear of said structure and connected to said valves for selectably shifting them, a crosshead integral with the top of said structure and provided with spaced openings, a set of spaced upstanding tubular transparent commodity reeciving members seated at their lower ends in the openings of the crosshead, one of said members communicating with one of the openings in said structure for discharge into the upper end of said chute, commodity conducting means leading from the other of the said members to the other of the said openings in said structure, an upper structure provided with means for supporting commodity supply pipes, for receiving the upper ends of said members and for establishing communication between said members and supply pipes, means for anchoring said upper structure to said crosshead, and means carried by said upper structure and said chute forming structure for coupling them to a suspension means therefor.

11. In a dispensing apparatus, a structure forming an upstanding chute provided with openings and spring controlled selectable shiftable valves slidably mounted in said structure for normally closing said openings, pivoted means arranged at the rear of said structure and connected to said valves for selectably shifting them, a crosshead integral with the top of said structure and provided with spaced openings, a set of spaced upstanding tubular transparent commodity receiving members seated at their lower ends in the openings of the crosshead, one of said members communicating with one of the openings in said structure for discharge into the upper end of said chute, commodity conducting means leading from the other of the said members to the other of the said openings in said structure, an upper structure provided with means for supporting commodity supply pipes, for receiving the upper ends of said members and for establishing communication between said members and supply pipes, means for anchoring said upper structure to said crosshead, and a valve controlled commodity conducting structure connected to said chute forming structure forwardly of the chute and to said upper structure forwardly of said members and including a transparent intake member adapted to communicate with a source of supply, the said conducting structure being open at its lower end.

12. In a dispensing apparatus, a vertical discharge chute, spaced vertically disposed transparent tubular members, a crosshead supporting said members, selectably opening normally closed valve controlled means for establishing communication between said members and chute, the valves of said means being spring controlled and slidably connected to said chute, pivotally supported means connected to said valves for selectably shifting them to open position, a structure provided with means for supporting commodity supply pipes, for receiving the upper ends of said members and for establishing communication between said members and the supply pipes, said structure being anchored to said crosshead, said chute being provided with grooves for said valves, and said chute provided with means for relieving said grooves from dust on the shifting of said valves to normal.

13. In a dispensing apparatus, a structure forming an upstanding chute provided with openings and spring controlled selectable shiftable valves slidably mounted in said structure for normally closing said openings, pivoted means arranged at the rear of said structure and connected to said valves for selectably shifting them, a crosshead integral with the top of said structure and provided with spaced openings, a set of spaced upstanding tubular transparent commodity receiving members seated at their lower ends in the openings of the crosshead, one of said members communicating with one of the openings in said structure for discharge into the upper end of said chute, commodity conducting means leading from the other of the said members to the other of the said openings in said structure, an upper structure provided with means for supporting commodity supply pipes, for receiving the upper ends of said members and for establishing communication between said members and supply pipes, means for anchoring said upper structure to said crosshead, means carried by said upper structure and said chute forming structure for coupling them to a suspension means therefor, said chute forming structure provided with grooves for said valves, and said chute forming structure having means for relieving the grooves from dust when the valves shift to normal.

GEORGE R. HUTCHISON.